(12) United States Patent
Ochi

(10) Patent No.: US 10,045,182 B2
(45) Date of Patent: Aug. 7, 2018

(54) SHORT-RANGE WIRELESS COMMUNICATION APPARATUS AND REGISTRATION MANAGEMENT PROGRAM

(71) Applicant: DENSO CORPORATION, Kariya, Aichi-pref. (JP)

(72) Inventor: Hikaru Ochi, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 29 days.

(21) Appl. No.: 15/125,236

(22) PCT Filed: Mar. 23, 2015

(86) PCT No.: PCT/JP2015/001619
§ 371 (c)(1),
(2) Date: Sep. 12, 2016

(87) PCT Pub. No.: WO2015/146128
PCT Pub. Date: Oct. 1, 2015

(65) Prior Publication Data
US 2017/0078835 A1    Mar. 16, 2017

(30) Foreign Application Priority Data

Mar. 25, 2014  (JP) ................................. 2014-062012
Dec. 10, 2014  (JP) ................................. 2014-249858

(51) Int. Cl.
*H04B 7/00*        (2006.01)
*H04W 4/80*        (2018.01)
(Continued)

(52) U.S. Cl.
CPC .............. *H04W 4/80* (2018.02); *H04W 4/04* (2013.01); *H04W 60/04* (2013.01); *H04W 60/06* (2013.01);
(Continued)

(58) Field of Classification Search
CPC ....... H04W 4/008; H04W 4/04; H04W 60/04; H04W 60/06; H04W 76/028; H04W 76/06; H04W 8/00
(Continued)

(56) References Cited

U.S. PATENT DOCUMENTS 6,452,912 B1 * 9/2002 Leem ................... H04B 1/7083
370/333
9,271,124 B2 * 2/2016 Sato ...................... H04L 63/083
(Continued)

FOREIGN PATENT DOCUMENTS

JP    2005286827 A    10/2005
JP    2011147004 A    7/2011

*Primary Examiner* — Eugene Yun
(74) *Attorney, Agent, or Firm* — Harness, Dickey & Pierce, P.L.C.

(57) ABSTRACT

A short-range wireless communication apparatus includes a contactless communicator, a short-range wireless communicator, a power detector for detecting a power-on state and a power-off state, and a controller for registering the mobile terminal establishing contactless communication upon determining that the contactless communication is established between the mobile terminal and the contactless communicator, and for permitting connection of the short-range wireless communication between the short-range wireless communicator and the mobile terminal until determining that the short-range wireless communication becomes unconnectable. When the power detector detects that the power-on state is changed to the power-off state and the power-off state is then changed to the power-on state, the controller causes the short-range wireless communicator to search for the registered mobile terminal. When the search is unsuccessful, the controller unregisters the mobile terminal for which the search is unsuccessful.

14 Claims, 13 Drawing Sheets

(51) Int. Cl.
*H04W 76/19* (2018.01)
*H04W 76/30* (2018.01)
*H04W 4/04* (2009.01)
*H04W 88/06* (2009.01)
*H04W 60/04* (2009.01)
*H04W 60/06* (2009.01)
*H04W 84/18* (2009.01)
*H04W 8/00* (2009.01)

(52) U.S. Cl.
CPC ........... *H04W 76/19* (2018.02); *H04W 76/30* (2018.02); *H04W 88/06* (2013.01); *H04W 4/046* (2013.01); *H04W 8/005* (2013.01); *H04W 84/18* (2013.01)

(58) Field of Classification Search
USPC ........................................................ 455/41.2
See application file for complete search history.

(56) References Cited

U.S. PATENT DOCUMENTS

| | | |
|---|---|---|
| 2007/0281735 A1 | 12/2007 | Suzuki |
| 2011/0177780 A1 | 7/2011 | Sato et al. |
| 2014/0196140 A1* | 7/2014 | Gong .................... H04L 67/104 |
| | | 726/10 |

\* cited by examiner

SHORT-RANGE WIRELESS COMMUNICATION APPARATUS AND REGISTRATION MANAGEMENT PROGRAM

CROSS REFERENCE TO RELATED APPLICATIONS

This application is a U.S. National Phase Application under 35 U.S.C. 371 of International Application No. PCT/JP2015/001619 filed on Mar. 23, 2015 and published in Japanese as WO 2015/146128 A1 on Oct. 1, 2015. This application is based on and claims the benefit of priority from Japanese Patent Applications No. 2014-062012 filed on Mar. 25, 2014, and No. 2014-249858 filed on Dec. 10, 2014. The entire disclosures of all of the above applications are incorporated herein by reference.

TECHNICAL FIELD

The present disclosure relates to a short-range wireless communication apparatus and a registration management program capable of contactless communication and short-range wireless communication with a mobile terminal.

BACKGROUND ART

Conventionally, an NFC (Near field Communication) function is provided with a Bluetooth (registered trade mark, hereinafter abbreviated as BT) handover function. A BT communication connection procedure using the BT handover function with NFC can identify a mobile terminal targeted for the BT communication connection and prevent interception by a third party, ensuring the security. According to a disclosed configuration using the BT handover function with NFC, a mobile terminal including an NFC communicator is positioned over a short-range wireless communication apparatus (other device or communication device) such as a navigation system including an NFC communicator. When the mobile terminal is positioned over the short-range wireless communication apparatus to establish the NFC communication, the mobile terminal is registered to the short-range wireless communication apparatus (permitted to connect to the BT communication) (e.g., see patent literature 1).

PRIOR ART LITERATURES

Patent Literature

Patent Literature 1: JP-2011-147004A

SUMMARY OF INVENTION

However, the inventor of the present application found the following difficulty in the above-mentioned configuration that registers a mobile terminal to the short-range wireless communication apparatus using the NFC function. In the description below, a host is assumed to be a user who daily uses the short-range wireless communication apparatus. A guest is assumed to be a user who temporarily uses the short-range wireless communication apparatus. Continuously registering guests' mobile terminals to the short-range wireless communication apparatus increases the number of mobile terminals registered to the short-range wireless communication apparatus. As a result, a list of registered mobile terminals contains a guest's mobile terminal currently using the short-range wireless communication apparatus and also a guest's mobile terminal not currently using the short-range wireless communication apparatus. The list is inconvenient for the guest to select the guest's own mobile terminal when the guest is currently going to use the short-range wireless communication apparatus. The list is also inconvenient for the host to unregister the mobile terminal of a guest who does not currently use the short-range wireless communication apparatus.

In order to share data (e.g., music data) stored in a guest's mobile terminal, a system may be configured to automatically try to connect the BT communication to all registered mobile terminals. In this case, it is necessary to determine whether a mobile terminal targeted at the connection belongs to a guest who is currently going to use the short-range wireless communication apparatus or a guest who does not currently use the short-range wireless communication apparatus. As a result, a useless time-out occurs until it is determined that the mobile terminal targeted at the connection is owned by a guest who is not currently going to use the short-range wireless communication apparatus. That being said, the technology according to patent literature 1 is inconvenient because a mobile terminal should be positioned over the short-range wireless communication apparatus to establish the NFC communication each time the mobile terminal permitted to connect the BT communication is changed over.

The present disclosure has been made in consideration of the foregoing. It is an object of the disclosure to provide a short-range wireless communication apparatus and a registration management program capable of easily sharing data stored in a mobile terminal and improving convenience by eliminating the need for inconvenient manipulation from a guest temporarily using the short-range wireless communication apparatus or a host daily using the same.

A short-range wireless communication apparatus in an example of the present disclosure comprises: a contactless communicator for performing contactless communication with a mobile terminal; a short-range wireless communicator for performing short-range wireless communication with the mobile terminal; a power detector for detecting a power-on state and a power-off state; and a controller for registering the mobile terminal establishing the contactless communication upon determining that the contactless communication is established between the mobile terminal and the contactless communicator, and for permitting connection of the short-range wireless communication between the short-range wireless communicator and the mobile terminal until determining that the short-range wireless communication becomes unconnectable. When the power detector detects that the power-on state is changed to the power-off state and the power-off state is then changed to the power-on state, the controller causes the short-range wireless communicator to search for the registered mobile terminal. When the search is unsuccessful, the controller unregisters the mobile terminal for which the search is unsuccessful.

Specifically, when the power-on state changes to the power-off state and then the power-off state changes to the power-on state, the short-range wireless communicator searches for the registered mobile terminal. When the search is unsuccessful, the mobile terminal for which the search is unsuccessful is unregistered. This can prevent an increase in the number of mobile terminals registered. A list of the registered mobile terminals can be displayed so that the list does not contain the mobile terminal of a guest (a temporary user of the short-range wireless communication apparatus) who does not currently use the short-range wireless communication apparatus. As a result, the guest can easily select the guest's mobile terminal when the guest currently intends to use the short-range wireless communication apparatus. A host (a daily user of the short-range wireless communication apparatus) need not take effort to unregister the mobile terminal of the guest who does not currently use the short-range wireless communication apparatus.

When the mobile terminal establishing the contactless communication is registered, the connection of the short-range wireless communication between the short-range wireless communicator and the mobile terminal is permitted until it is determined that the short-range wireless communication becomes unconnectable. This can eliminate the effort to establish contactless communication each time the mobile terminal permitted to connect the short-range wireless communication is changed over. The guest or the host can avoid inconvenient manipulation and easily share data stored in the mobile terminal. This can improve convenience.

A registration management program in an example of the present disclosure is provided for a controller of a short-range wireless communication apparatus. The short-range wireless communication apparatus includes a contactless communicator for performing contactless communication with a mobile terminal, a short-range wireless communicator for performing short-range wireless communication with the mobile terminal, and a power detector for detect a power-on state and a power-off state. The registration management program causes a microcomputer of the controller to perform: a first procedure that registers the mobile terminal establishing the contactless communication with the contactless communicator when it is determined that the contactless communication is established between the mobile terminal and the contactless communicator; a second procedure that permits connection of the short-range wireless communication between the short-range wireless communicator and the mobile terminal until it is determined that the short-range wireless communication becomes unconnectable; a third procedure that causes the short-range wireless communicator to search for the registered mobile terminal when the power detector detects that the power-on state is changed to power-off state and the power-off state is then changed to the power-on state; and a fourth procedure that unregisters the mobile terminal for which the search is unsuccessful in the third procedure.

This registration management program can provide the same advantages as the above short-range wireless communication apparatus. The registration management program may be stored in a non-transitory storage medium.

A short-range wireless communication apparatus in another example of the present disclosure comprises: a contactless communicator for performing contactless communication with a mobile terminal; a short-range wireless communicator for performing short-range wireless communication with the mobile terminal; a power detector for detecting a power-on state and a power-off state; and a controller for registering the mobile terminal establishing the contactless communication when determining that the contactless communication between the mobile terminal and the contactless communicator, and for permitting connection of the short-range wireless communication between the short-range wireless communicator and the mobile terminal until determining that the short-range wireless communication becomes unconnectable. When the power detector detects that the power-on state is changed to power-off state, the controller unregisters the registered mobile terminal.

Specifically, the controller unregisters a registered mobile terminal when the power-on state changes to the power-off state. This can prevent an increase in the number of mobile terminals registered. A displayed list of the registered mobile terminals can avoid containing display of the mobile terminal of the guest who does not currently use the short-range wireless communication apparatus. As a result, the guest can easily select the guest's mobile terminal when the guest currently intends to use the short-range wireless communication apparatus. The host need not take effort to unregister the mobile terminal of the guest who does not currently use the short-range wireless communication apparatus.

When the mobile terminal establishing the contactless communication is registered, the connection of the short-range wireless communication between the short-range wireless communicator and the mobile terminal is permitted until it is determined that the short-range wireless communication becomes unconnectable. This can eliminate the effort to establish the contactless communication each time the mobile terminal permitted to connect short-range wireless communication is changed over. The guest or the host can avoid inconvenient manipulation and easily share data stored in the mobile terminal. This can improve convenience.

A registration management program in a second example of the present disclosure is provided for a controller of a short-range wireless communication apparatus. The short-range wireless communication apparatus includes a contactless communicator for performing contactless communication with a mobile terminal, a short-range wireless communicator for performing short-range wireless communication with the mobile terminal, and a power detector for detect a power-on state and a power-off state. The registration management program causes a microcomputer of the controller to perform: a first procedure that registers the mobile terminal establishing the contactless communication with the contactless communicator when it is determined that the contactless communication is established between the mobile terminal and the contactless communicator; a second procedure that permits connection of the short-range wireless communication between the short-range wireless communicator and the mobile terminal until it is determined that the short-range wireless communication becomes unconnectable; and a third procedure that unregisters the registered mobile terminal when the power detector detects that the power-on state is changed to power-off state.

This registration management program can provide the same advantages as the short-range wireless communication apparatus. The registration management program may be stored in a non-transitory storage medium.

BRIEF DESCRIPTION OF DRAWINGS

The foregoing and other objects, features and advantages of the present disclosure will become more apparent from the below detailed description given below with reference to the accompanying drawings in which.

EMBODIMENTS FOR CARRYING OUT INVENTION

First Embodiment

Figure 1:
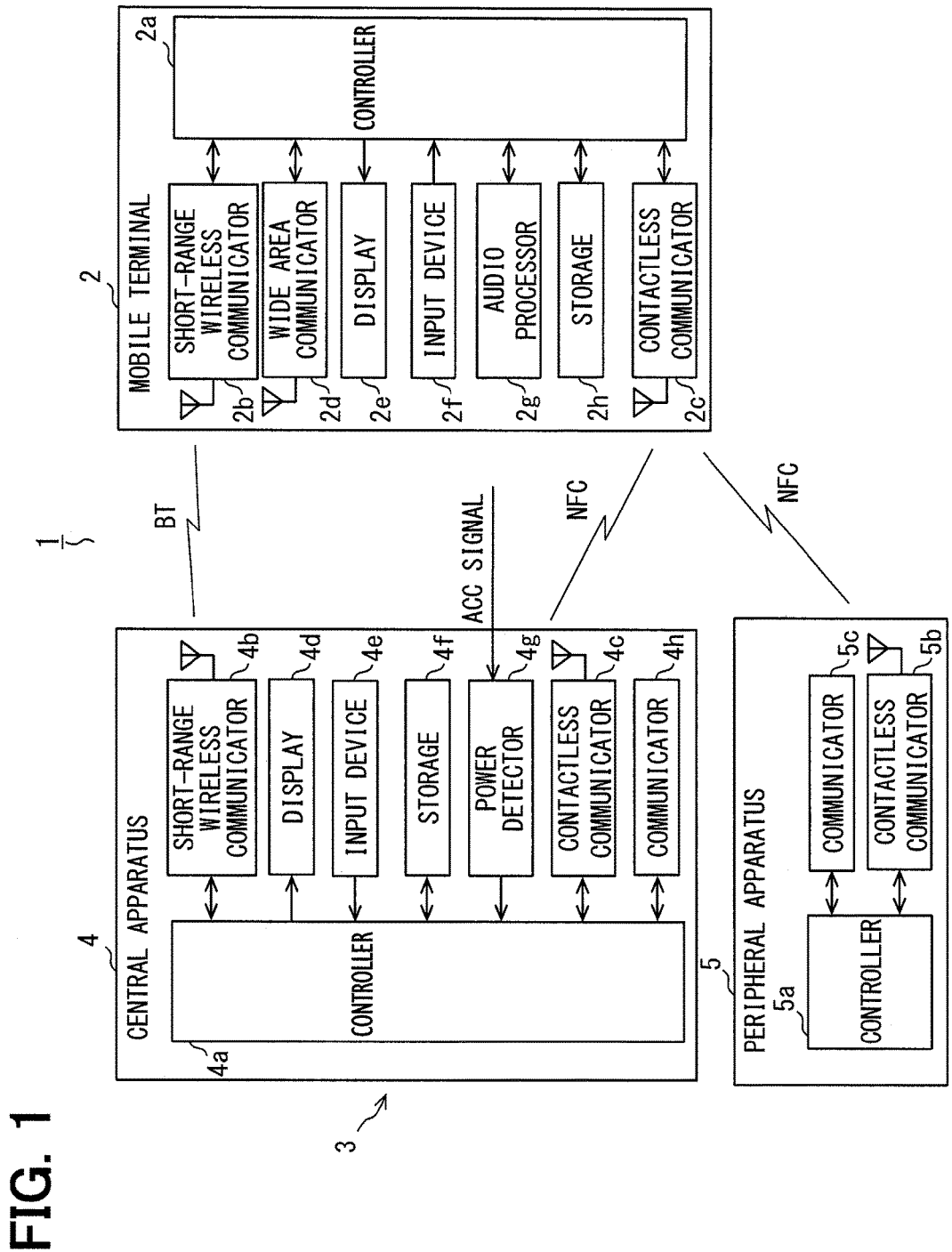
FIG. 1 is a function block diagram illustrating a first embodiment.

The description below explains a short-range wireless communication apparatus according to the first embodiment used in a vehicular short-range wireless communication system 1 with reference to FIGS. 1 through 12. The vehicular short-range wireless communication system 1 includes a mobile terminal 2 and a short-range wireless communication apparatus 3. A user can bring the mobile terminal 2 into a vehicle compartment. The short-range wireless communication apparatus 3 is mounted on a vehicle. The short-range wireless communication apparatus 3 includes a central apparatus 4 (first apparatus) and a peripheral apparatus 5 (second apparatus). According to FIG. 1, one central apparatus 4 connects with one peripheral apparatus 5. However, one central apparatus 4 may connect with two or more peripheral apparatuses 5. The central apparatus 4 may include a navigation system including known navigation functions such as those specifying a vehicle's current position, providing map matching between the vehicle's current position and road data, setting a destination, and retrieving a route from the vehicle's current position to a destination.

The mobile terminal 2 is available as a multifunctional portable terminal such as a smartphone. The mobile terminal 2 includes a controller 2a, a short-range wireless communicator 2b, a contactless communicator 2c, a wide area communicator 2d, a display 2e, an input device 2f, an audio processor 2g, and a storage 2h. The controller 2a is mainly configured as a microcomputer including a CPU (central processing unit), ROM (read only memory), and RAM (random access memory). The controller 2a controls overall operation of the mobile terminal 2 such as the short-range wireless communication, the contactless communication, and storing the registration information while the CPU executes a control program stored in the ROM.

The short-range wireless communicator 2b performs short-range wireless communication with a short-range wireless communicator 4b of the central apparatus 4 (to be described). In this case, the short-range wireless communicator 2b performs Bluetooth (registered trademark, hereinafter abbreviated as BT) communication as the short-range wireless communication. The contactless communicator 2c performs contactless communication with a contactless communicator 4c of the central apparatus 4 or a contactless communicator 5b of the peripheral apparatus 5 (to be described). In this case, the contactless communicator 2c performs NFC (near field communication) communication as the contactless communication. The wide area communicator 2d performs wide area communication with a base station via a mobile telephone network.

When a display command is input from the controller 2a, the display 2e displays various screens such as a home screen and a menu screen in accordance with the input display command. The input device 2f includes a mechanical button (e.g., home button) provided for a body and a touch button formed in the display 2e. When a user presses a button, the input device 2f outputs a manipulation notification to the controller 2a, notifying that the user presses the button. The audio processor 2g processes a sound input to a microphone (not shown) as an incoming sound or a sound output from a speaker (not shown) as an outgoing sound. The storage 2h includes a storage area capable of storing the registration information about the mobile terminal 2 and the registration information about the central apparatus 4. The registration information about the mobile terminal 2 contains a BT address and security information (such as public key and random number) concerning the mobile terminal 2. The registration information about the central apparatus 4 contains a BT address and security information (such as public key and random number) concerning the central apparatus 4. The storage 2h also includes a storage area capable of storing various data such as music data.

Figure 2:
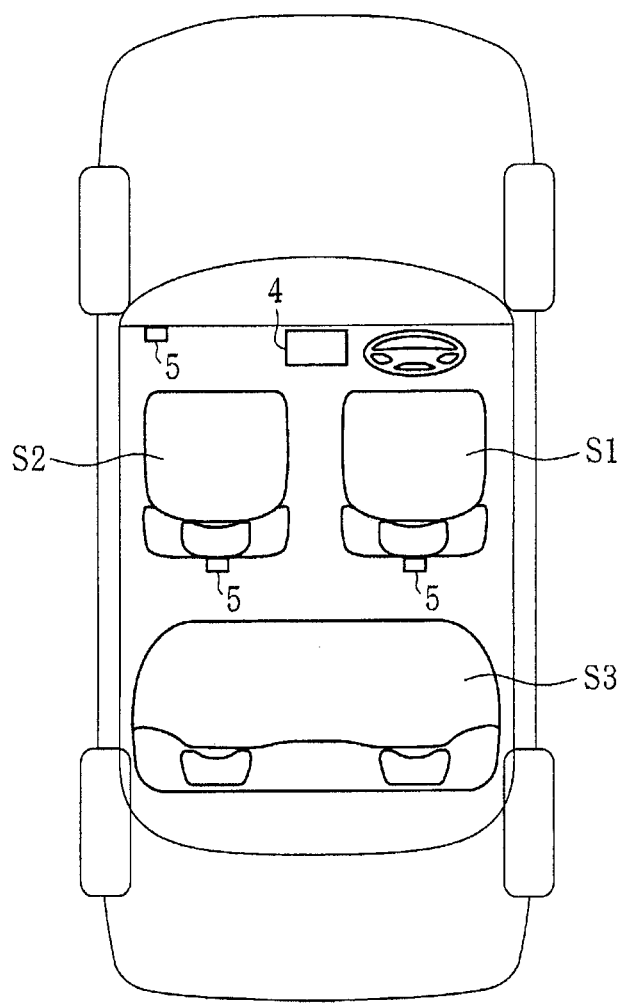
FIG. 2 is a diagram illustrating placement of a central apparatus and a peripheral apparatus.
Figure 3:
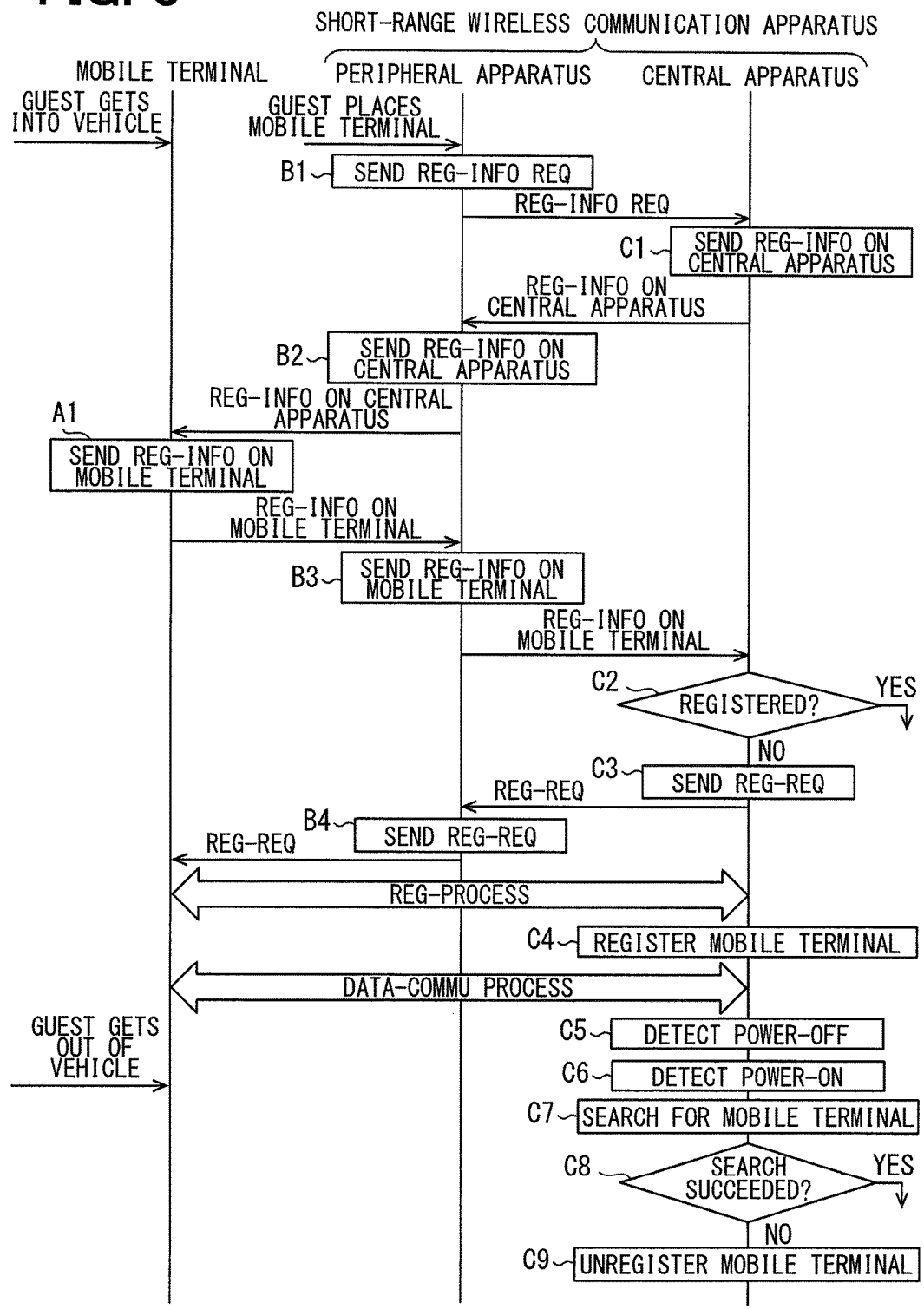
FIG. 3 is a first sequence diagram.
Figure 4:
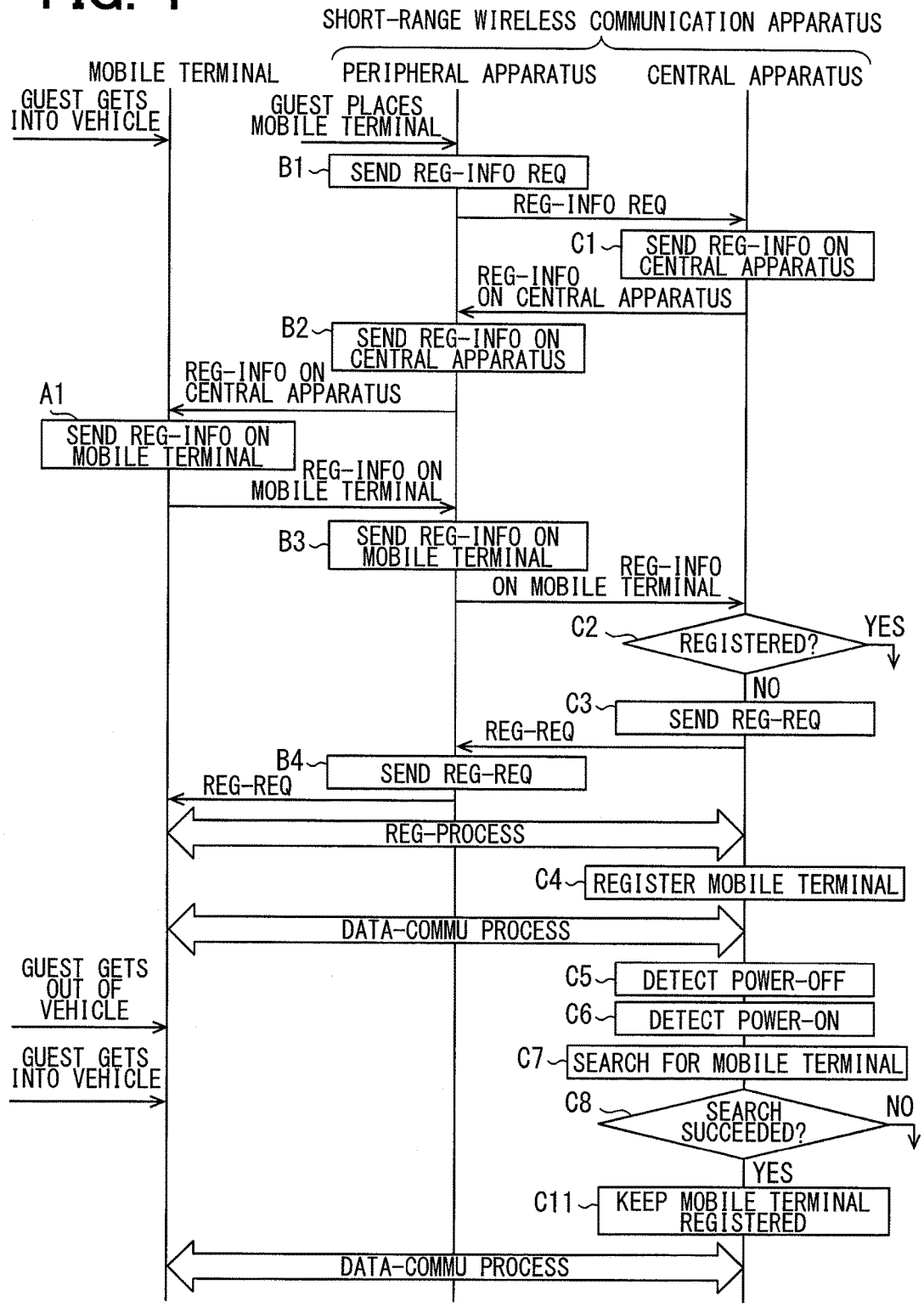
FIG. 4 is a second sequence diagram.
Figure 5:
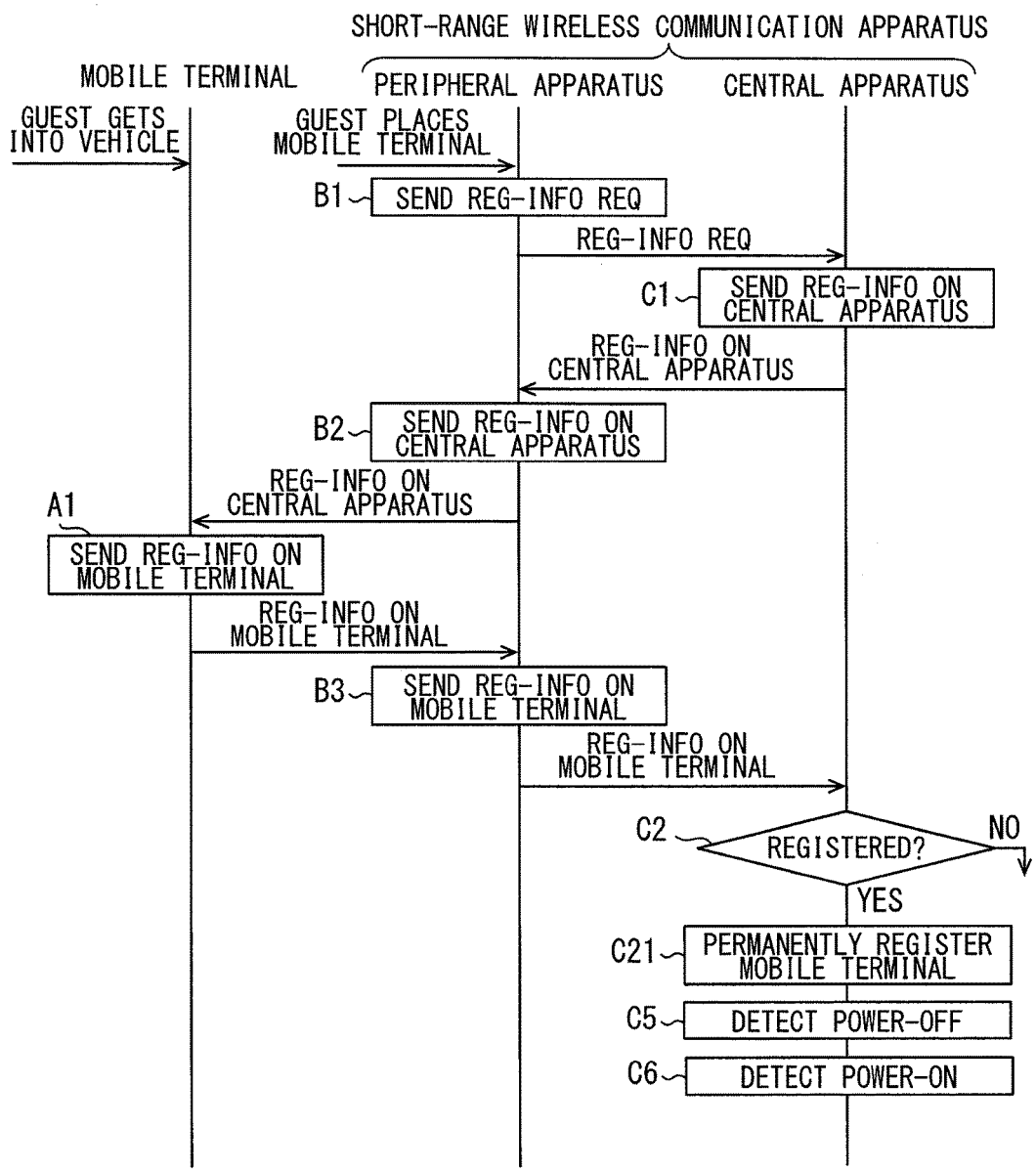
FIG. 5 is a third sequence diagram.

As illustrated in FIG. 2, the central apparatus 4 is provided near a driver's seat (S1 in FIG. 2) (e.g., beside an instrument panel) in the vehicle compartment. Namely, the central apparatus 4 is provided at a place that enables a driver seated on the driver's seat to easily position the mobile terminal 2 over the central apparatus 4 after the driver gets into the vehicle and sits on the driver's seat. A body of the central apparatus 4 has a mark indicating a communication area for the contactless communication. The driver can position the mobile terminal 2 over the central apparatus 4 using the mark as a target to successfully perform the contactless communication between the mobile terminal 2 and the central apparatus 4.

The central apparatus 4 includes a controller 4a (control means), a short-range wireless communicator 4b (short-range wireless communication means), a contactless communicator 4c (contactless communication means), a display 4d, an input device 4e (first input device, second input device), a storage 4f, a power detector 4g (power detection means), and a communicator 4h. The controller 4a is mainly configured as a microcomputer including a CPU, ROM, and RAM. The controller 4a controls overall operation of the central apparatus 4 such as the short-range wireless communication, the contactless communication, and storing the registration information while the CPU executes a control program (including a registration management program) stored in the ROM.

The short-range wireless communicator 4b performs short-range wireless communication with the short-range wireless communicator 2b of the mobile terminal 2. The contactless communicator 4c performs contactless communication with the contactless communicator 2c of the mobile terminal 2 when the mobile terminal 2 is positioned over the central apparatus 4 and is placed in the communication area for the contactless communication. When a display command is input from the controller 4a, the display 4d displays various screens such as a home screen and a menu screen in accordance with the input display command. The input device 4e includes a mechanical button (e.g., power supply) provided for a body and a touch button formed in the display 4d. When a user presses a button, the input device 4e outputs a manipulation notification to the controller 4a, notifying that the user presses the button. The storage 4f includes a storage area capable of storing the registration information about the central apparatus 4 or the registration information about the mobile terminal 2.

The power detector 4g is supplied with an ACC signal indicating the on/off-state of an ACC (accessory) switch of the vehicle. The controller 4a may detect a change from the off-state to the on-state of the ACC switch according to the ACC signal input to the power detector 4g from the ACC switch. In this case, the controller 4a changes the central apparatus 4 from the power-off state (inactive) to the power-on state (active) to start the central apparatus 4. The controller 4a may detect a change from the on-state to the off-state of the ACC switch according to the ACC signal input to the power detector 4g from the ACC switch. In this case, the controller 4a changes the central apparatus 4 from the power-on state to the power-off state to stop the central apparatus 4. The power-off state disables the short-range wireless communication or prevents the user's manipulation from being accepted, for example. The power-off state consumes lower operating power than usual (low power consumption). The power-on state establishes the short-range wireless communication or accepts the user's manipulation, for example. The power-on state consumes usual operating power. The communicator 4h performs data communication with a communicator 5c of the peripheral apparatus 5 (to be described). In this case, the communicator 4h may perform data communication with the communicator 5c wiredly or wirelessly.

As illustrated in FIG. 2, the peripheral apparatus 5 is provided near a passenger seat (S2 in FIG. 2) or a rear seat (S3 in FIG. 2) in the vehicle compartment. For this reason, the peripheral apparatus 5 may be provided on a dashboard near a passenger seat door or at the rear of the driver's seat or the passenger seat, for example. Namely, the peripheral apparatus 5 is provided at a place that enables a passenger seated on the passenger seat or the rear seat to easily position the mobile terminal 2 over the peripheral apparatus 5 after the passenger gets into the vehicle and sits on the passenger seat or the rear seat. A body of the peripheral apparatus 5 has also a mark indicating a communication area for the contactless communication. The passenger can position the mobile terminal 2 over the peripheral apparatus 5 using the mark as a target to successfully perform the contactless communication between the mobile terminal 2 and the peripheral apparatus 5.

The peripheral apparatus 5 includes a controller 5a, a contactless communicator 5b (contactless communication means), and a communicator 5c. The controller 5a is mainly configured as a microcomputer including a CPU, ROM, and RAM. The controller 5a controls overall operation of the peripheral apparatus 5 such as the contactless communication while the CPU executes a control program stored in the ROM. The contactless communicator 5b performs contactless communication with the contactless communicator 2c of the mobile terminal 2 when the mobile terminal 2 is positioned over the peripheral apparatus 5 and is placed in the communication area for the contactless communication. The communicator 5c performs data communication with the communicator 4h of the central apparatus 4.

The description below explains how the mobile terminal 2 is used. The driver (or an owner of the vehicle) is assumed to be a host, who is daily user of the short-range wireless communication apparatus 3 (particularly the central apparatus 4). The passenger is assumed to be a guest, who is a temporary user of the short-range wireless communication apparatus 3. Several guests, if any, are denoted as guest A, guest B, and so on. The host gets into the vehicle, sits on the driver's seat, and places the host's mobile terminal 2 over the central apparatus 4. Guest A gets into the vehicle, sits on the passenger seat, and may place guest A's mobile terminal 2 over the peripheral apparatus 5 near the passenger seat if guest A needs to share data stored in guest A's mobile terminal 2. Similarly, guest B gets into the vehicle, sits on the rear seat, and may place guest B's mobile terminal 2 over the peripheral apparatus 5 near the passenger seat if guest B needs to share data stored in guest B's mobile terminal 2.

Operations of the above-mentioned configuration will be described with reference to FIGS. 3 through 12. The description below assumes that the guest gets into the vehicle and places the mobile terminal 2 over the peripheral apparatus 5.

Suppose that the guest gets into the vehicle while carrying the guest's mobile terminal 2 and correctly places the mobile terminal 2 over the peripheral apparatus 5. This establishes contactless communication between the contactless communicator 2c of the mobile terminal 2 and the contactless communicator 5b of the peripheral apparatus 5. When the contactless communication is established between the peripheral apparatus 5 and the mobile terminal 2, the controller 5a of the peripheral apparatus 5 causes the communicator 5c to transmit a registration information request to the central apparatus 4 (B1).

When the central apparatus 4, the controller 4a of the central apparatus 4 determines that the communicator 4h receives the registration information request, the controller 4a reads the registration information about the central apparatus 4 stored in the storage 4f. The registration information contains a BT address and security information about the central apparatus 4. The controller 4a causes the communicator 4h to transmit the read registration information about the central apparatus 4 to the peripheral apparatus 5 (C1). When the controller 5a of the peripheral apparatus 5 determines that the communicator 5c receives the registration information about the central apparatus 4, the controller 5a causes the contactless communicator 5b to transmit the received registration information about the central apparatus 4 to the mobile terminal 2 using the contactless communication (B2).

When the controller 2a of the mobile terminal 2 determines that the contactless communicator 2c receives the registration information about the central apparatus 4, the controller 2a reads registration information about the mobile terminal 2 stored in the storage 2h. The registration information contains a BT address and security information about the mobile terminal 2. The controller 2a causes the contactless communicator 2c to transmit the read registration information about the mobile terminal 2 to the peripheral apparatus 5 using the contactless communication (A1). When the controller 5a of the peripheral apparatus 5 determines that the contactless communicator 5b receives the registration information about the mobile terminal 2, the controller 5a allows the communicator 5c to transmit the received registration information about the mobile terminal 2 to the central apparatus 4 (B3).

When the controller 4a of the central apparatus 4 determines that the communicator 4h receives the registration information about the mobile terminal 2, the controller 4a determines whether the received registration information about the mobile terminal 2 is already stored in the storage 4f to determine whether the mobile terminal 2 is already registered (C2). When the controller 4a determines that the received registration information about the mobile terminal 2 is not stored in the storage 4f and the mobile terminal 2 is not registered (C2: NO), the controller 4a causes the communicator 4h to transmit a registration request to the peripheral apparatus 5 (C3). When the controller 5a of the peripheral apparatus 5 determines that the communicator 5c receives the registration request, the controller 5a causes the contactless communicator 5b to transmit the received registration request to the mobile terminal 2 (B4).

When the controller 2a of the mobile terminal 2 determines that the contactless communicator 2c receives the registration request, the controller 2a performs a registration process in relation to the controller 4a of the central apparatus 4. When the controller 2a finishes the registration process successfully, the controller 2a stores the registration information about the central apparatus 4 in the storage 2h. When the registration process is successfully finished in the central apparatus 4, the controller 4a stores the registration information about the mobile terminal 2 in the storage 4f, thereby registering the mobile terminal 2. The controller 4a permits BT communication connection with the mobile terminal 2 (C4, a first procedure). At this point, because the registration information about the mobile terminal 2 is stored in the storage 4f, when the display 4d displays a list of the registered mobile terminals 2, terminal information (e.g., model name) about the guest's mobile terminal 2 registered this the registration process is displayed. When the host's mobile terminal 2 is already registered, the controller 4a displays terminal information about the host's mobile terminal 2 in addition to terminal information about the guest's mobile terminal 2 registered by this registration process.

When permitting the BT communication connection with the mobile terminal 2, the controller 4a establishes a BT line connection between the short-range wireless communicator 4b and the short-range wireless communicator 2b. When the BT line connection is established, the controller 4a connects to a specified profile on the BT line and performs a data communication process using the specified profile. In the mobile terminal 2, the controller 2a may connect to AVP (Audio/Video Profile), A2DP (Advanced Audio Distribution Profile), and AVRCP (Audio/Video Remote Control Profile)) on the BT line, for example. In this case, the controller 2a reads music data stored in the storage 2h and allows the short-range wireless communicator 2b to transfer the read music data to the central apparatus 4. In the central apparatus 4, the controller 4a allows the music data transferred from the mobile terminal 2 to be audibly generated from a speaker (not shown) provided for the central apparatus 4.

When the input device 4e of the central apparatus 4 is manipulated to input a command such as a replay command or a stop command, the controller 4a causes the short-range wireless communicator 4b to transfer the accepted command to the mobile terminal 2. In the mobile terminal 2, the controller 2a provides control to replay or stop the music data based on the command transferred from the central apparatus 4. When the guest gets into the vehicle and places the mobile terminal 2 over the peripheral apparatus 5, the above-mentioned process registers the guest's mobile terminal 2 to the central apparatus 4 and permits the BT communication connection between the mobile terminal 2 and the central apparatus 4. Then, music data stored in the mobile terminal 2 is transferred to the central apparatus 4 and the music data is audibly output from the speaker provided for the central apparatus 4. This can share the music data stored in the guest's mobile terminal 2.

The guest may thereafter get out of the vehicle while carrying the guest's mobile terminal 2 and the mobile terminal 2 may leave a range of the BT communication for the central apparatus 4 (the BT communication becomes unconnectable). In this case, the controller 4a disconnects the BT line established between the short-range wireless communicator 4b and the short-range wireless communicator 2b. In another situation, the host may change the ACC switch from the on-state to the off-state to get out of the vehicle and the power detector 4g may accordingly detect a change from the power-on state to the power-off state (the BT communication becomes unconnectable) (C5). Also in this case, the controller 4a disconnects the BT line established between the short-range wireless communicator 4b and the short-range wireless communicator 2b. Namely, the controller 4a permits the BT communication connection until determining that the BT communication becomes unconnectable (second procedure).

When the host changes the ACC switch from the off-state to the on-state to get into the vehicle and the power detector 4g accordingly detects a change from the power-off state to the power-on state (C6), the controller 4a causes the short-range wireless communicator 4b to search for the mobile terminal 2 registered now (C7, third procedure). In the above, if the most recent guest (who most recently changes the power-on state to the power-off state) gets into the vehicle while carrying the guest's mobile terminal 2, the controller 4a succeeds in searching for the mobile terminal 2 of the most recent guest. Suppose that the most recent guest does not get into the vehicle, or the most recent guest gets into the vehicle without carrying the guest's mobile terminal 2. In such a case, the controller 4a fails to search for the mobile terminal 2 of the most recent guest.

When the controller 4a determines that the search for the mobile terminal 2 is unsuccessful (not successful) (C8: NO), the controller 4a deletes (erases) the registration information about the most recent guest's mobile terminal 2 stored in the storage 4f and unregisters the most recent guest's mobile terminal 2 (C9 or fourth procedure). As a result, because the most recent guest's mobile terminal 2 is unregistered at this point, the controller 4a does not display the terminal information about the most recent guest's mobile terminal 2 in a list of the registered mobile terminals 2 on the display 4d. Specifically, the controller 4a displays only the terminal information about the mobile terminal 2 of the host if the mobile terminal 2 of the host is registered.

When the controller 4a determines that the search for the mobile terminal 2 is successful (C8: YES), the controller 4a keeps the most recent guest's mobile terminal 2 registered (C11). Because the most recent guest's mobile terminal 2 remains registered at this point, the controller 4a displays the most recent guest's mobile terminal 2 in a list of the registered mobile terminals 2 on the display 4d. The controller 4a displays the terminal information about the most recent guest's mobile terminal 2 in addition to the terminal information about the host's mobile terminal 2 when the host's mobile terminal 2 is registered. Since the registration of the guest's mobile terminal 2 continues, the controller 4a makes BT line connection between the short-range wireless communicator 4b and the short-range wireless communicator 2b. When the BT line is connected, the controller 4a connects with a specified profile on the BT line and performs a data communication process using the specified profile.

Figure 6:
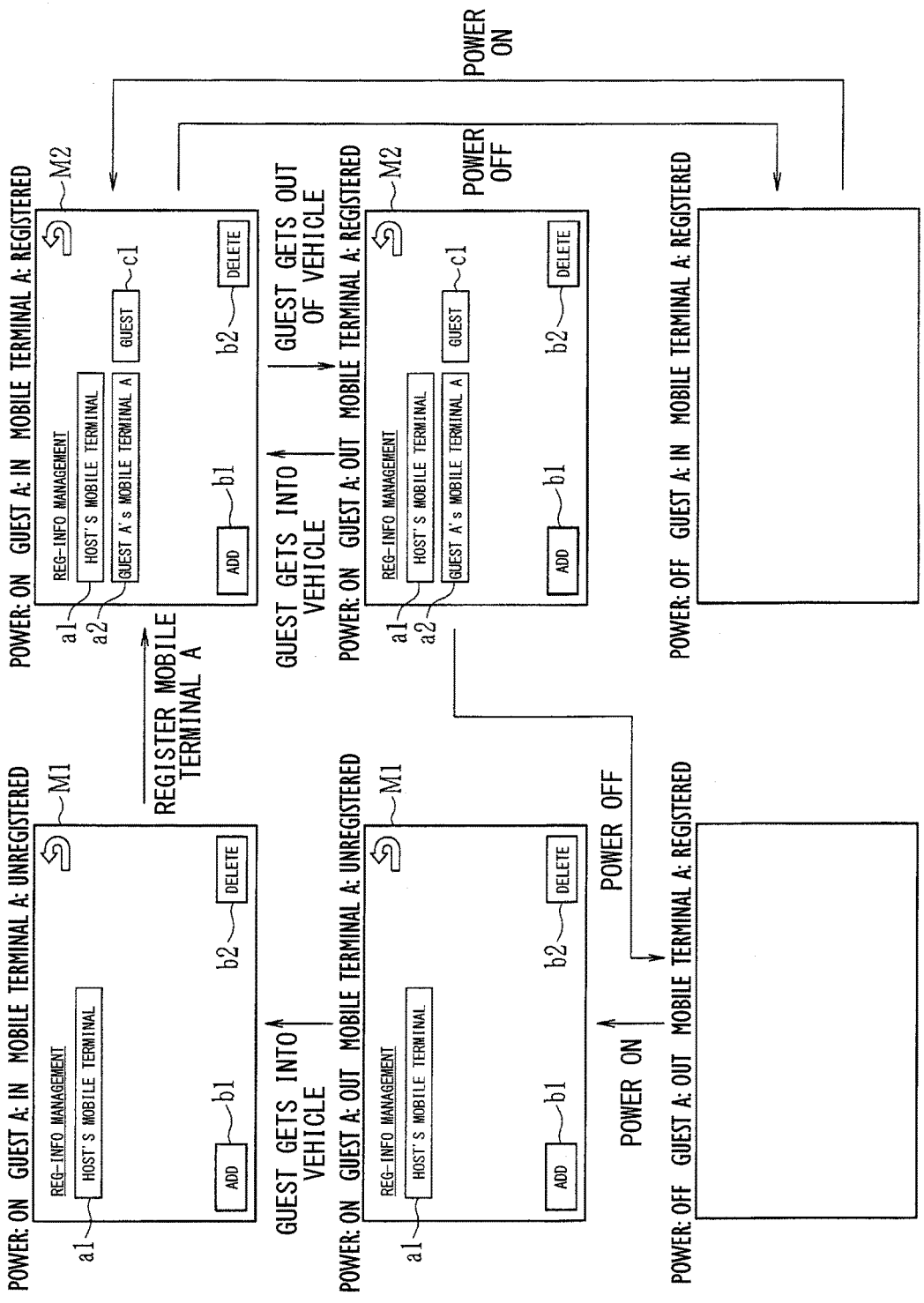
FIG. 6 is a diagram illustrating an example of transition of screens to manage registration information.

The controller 4a performs the above-mentioned process to cause a transition of screens of management of the registration information as illustrated in FIG. 6. Suppose that only the host's mobile terminal 2 is registered and the mobile terminal 2 of guest A (mobile terminal A) is not registered (unregistered). In this case, the controller 4a displays screen M1 indicating that only the host's mobile terminal 2 is registered. Screen M1 displays terminal information a1 about the host's mobile terminal 2, addition button b1, and deletion button b2.

Suppose that guest A places the guest A's mobile terminal 2 over the peripheral apparatus 5 to register the guest A's mobile terminal 2. In this case, the controller 4a changes screen M1 to screen M2. Screen M2 is displayed to indicate that the host's mobile terminal 2 and guest A's mobile terminal 2 are registered. Screen M2 displays terminal information a2 about the guest's mobile terminal 2 in addition to terminal information a1 about the host's mobile terminal 2. Screen M2 also displays icon C1 representing the guest's mobile terminal 2. Screen M2 also displays addition button b1 and deletion button b2. The controller 4a continues to display screen M2 when the power remains on even if guest A repeats getting into or out of the vehicle in this state. When the power-on state changes to the power-off state while guest A remains onboard, the controller 4a dismisses screen M2. Thereafter, when the power-off state changes to the power-on state while guest A remains onboard, the controller 4a re-displays screen M2.

Guest A may get out of the vehicle while carrying guest A's mobile terminal 2 and the power-on state may change to the power-off state. In this case, the controller 4a dismisses screen M2. The power-off state may thereafter change to the power-on state. At this point, if guest A is out of the vehicle or guest A is in the vehicle without carrying guest A's mobile terminal 2, the controller 4a determines that the search for guest A's mobile terminal 2 is unsuccessful. In this case, the controller 4a deletes the registration information about guest A's mobile terminal 2 to unregister guest A's mobile terminal 2 and displays screen M1 without displaying screen M2. Accordingly, the mobile terminal 2 of the guest not currently using the short-range wireless communication apparatus 3 is not displayed.

Figure 7:
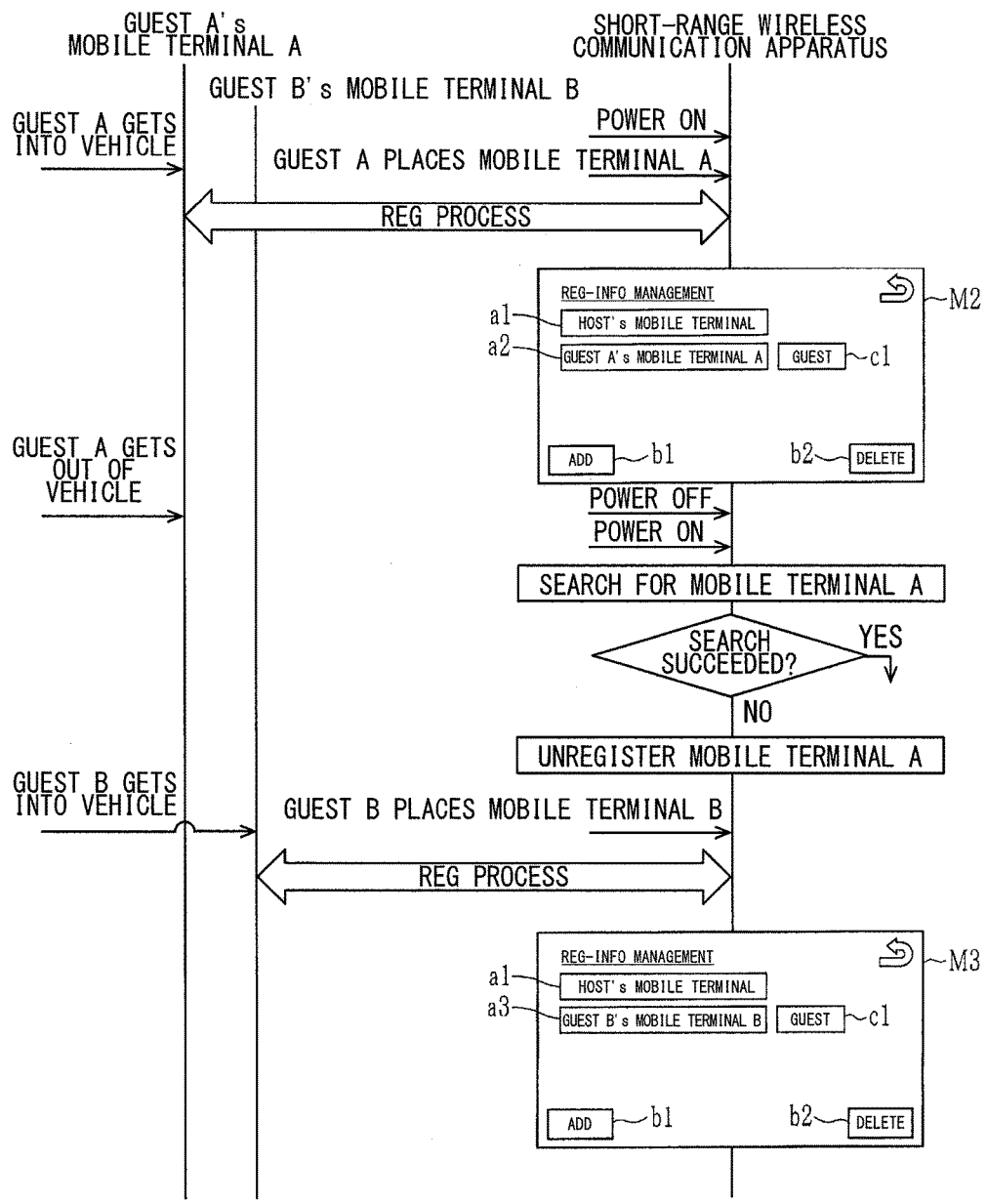
FIG. 7 is a sequence diagram illustrating comparison with a comparative example.

As illustrated in FIG. 7, in cases where the host's mobile terminal 2 is already registered, when guest A gets into the vehicle while carrying guest A's mobile terminal 2 and the controller 4a registers guest A's mobile terminal 2, the screen M1 for managing the registration information displays terminal information a1 about the host's mobile terminal 2 and terminal information a2 about guest A's mobile terminal 2. Thereafter, when the power-on state changes to the power-off state and then the power-off state changes to the power-on state and then Guest B instead of guest A gets into the vehicle while carrying guest B's mobile terminal 2, the controller 4a unsuccessfully searches for guest A's mobile terminal 2 and unregisters guest A's mobile terminal 2. When the controller 4a registers guest B's mobile terminal 2, screen M3 for managing the registration information displays terminal information a3 about guest B's mobile terminal 2 instead of terminal information a2 about guest A's mobile terminal 2.

Figure 8:
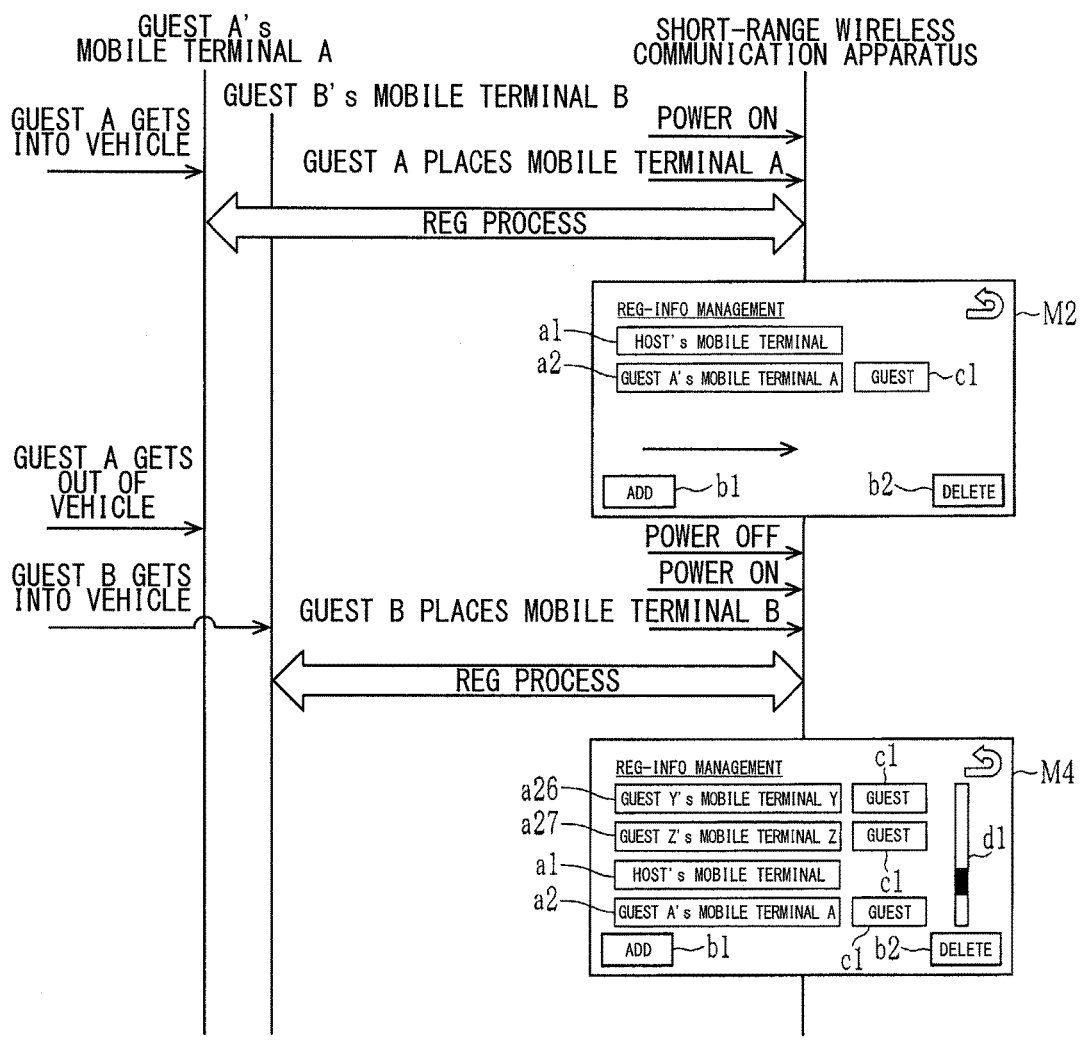
FIG. 8 is a sequence diagram illustrating a first comparative example.

A comparative example in FIG. 8 does not search for guest A's mobile terminal 2 unlike the embodiment and does not unregister guest A's mobile terminal 2 for which a search fails. Thus, registration information management screen M4 displays the terminal information (a1, a2, . . . , a26, and a27 in FIG. 8) about all the registered mobile terminals 2 and scrollbar d1. According to the comparative example, guest B inconveniently selects guest B's mobile terminal 2 on registration information management screen M4. According to the embodiment, however, guest B can easily select guest B's mobile terminal 2 on registration information management screen M3.

Figure 9:
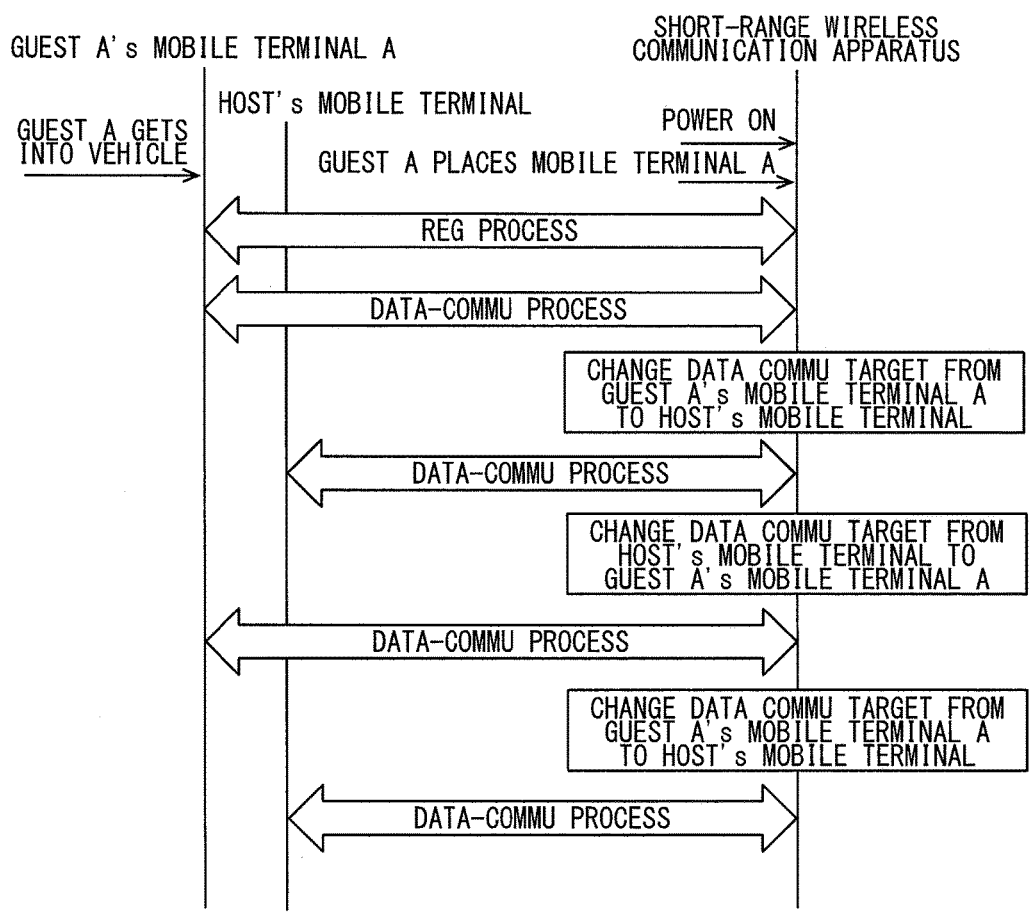
FIG. 9 is another sequence diagram illustrating comparison with a comparative example.

As illustrated in FIG. 9, when the controller 4a registers guest A's mobile terminal 2 while the host's mobile terminal 2 is already registered, the controller 4a does not perform the subsequent registration process during as long as the power-on state is kept. The controller 4a changes the mobile terminal 2 targeted at the data communication. The controller 4a changes over between the data communication process for guest A's mobile terminal 2 and the data communication process for the host's mobile terminal 2.

Figure 10:
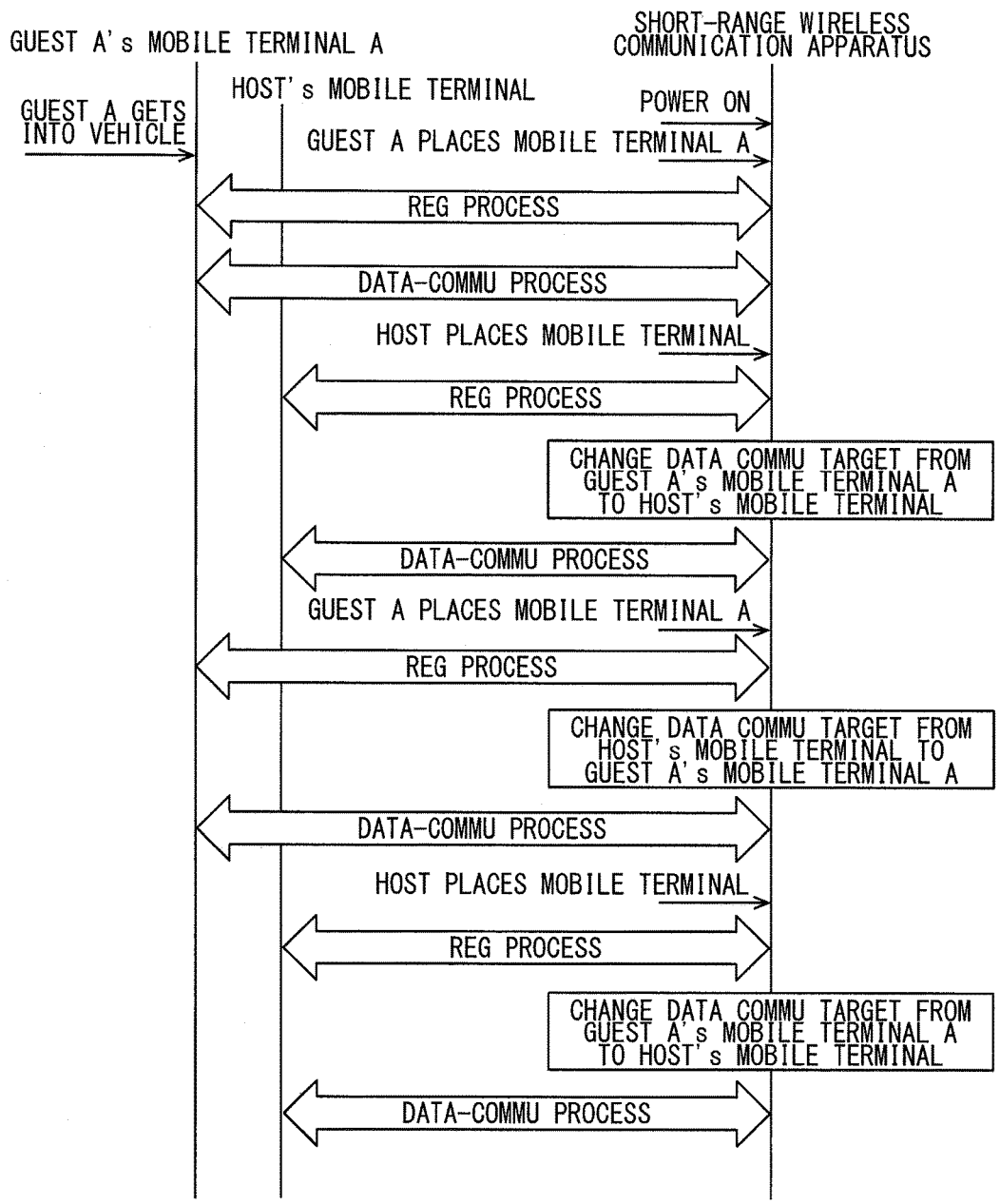
FIG. 10 is a sequence diagram illustrating a second comparative example.

A comparative example in FIG. 10 (corresponding to a configuration of patent literature 1 in which the mobile terminal 2 is manipulated each time the mobile terminal 2 permitted to connect the BT communication is changed over) changes over the data communication process on condition that the registration process is performed subsequently. Specifically, the data communication process for guest A's mobile terminal 2 and the data communication process for the host's mobile terminal 2 are changed over to each other on condition that the host places the host's mobile terminal 2 over the central apparatus 4 or guest A places guest A's mobile terminal 2 over the peripheral apparatus 5. According to the comparative example, guest A or the host inconveniently changes over the mobile terminal 2 targeted at the data communication (e.g., an origin of transferring music data). According to the embodiment, however, guest A or the host can easily change over the mobile terminal 2 targeted at the data communication. For example, in order to change over between audio output of music data stored in guest A's mobile terminal 2 and audio output of music data stored in the host's mobile terminal 2, guest A or the host just needs to manipulate the central apparatus 4 to input a changeover command to change over an origin of transferring music data.

The controller 4a may determine that the communicator 4h receives the registration information about the mobile terminal 2 and that the mobile terminal 2 is already registered (C2: YES). In this case, because the registration process of registering the mobile terminal 2 was already finished, the controller 4a permanently registers the mobile terminal 2 (C21). Thereafter, the controller 4a does not allow the short-range wireless communicator 4b to search for the mobile terminal 2 permanently registered even if the power detector 4g detects a change from the power-on state to the power-off state (C5) and the power detector 4g detects a change from the power-off state to the power-on state (C6). The controller 4a excludes the permanently registered mobile terminal 2 from targets to be searched for and unregistered.

According to the embodiment, when the guest places the guest's mobile terminal 2 over the peripheral apparatus 5 only once and the contactless communication is established only once, the central apparatus 4 registers the mobile terminal 2. By contrast, when the guest places the guest's mobile terminal 2 over the peripheral apparatus 5 twice successively and the contactless communication is established twice successively (when a permanent registration condition is satisfied), the central apparatus 4 permanently registers the mobile terminal 2. The guest can select the temporary registration or the permanent registration by selecting the number of times to place the mobile terminal 2 over the peripheral apparatus 5. Alternatively, when the guest selects the mobile terminal 2 and presses addition button b1 (when a user's first manipulation is accepted), the central apparatus 4 may permanently register the mobile terminal 2 selected by the guest. When the guest selects the mobile terminal 2 and presses deletion button b2 (when a user's second manipulation is accepted), the central apparatus 4 may release the permanent registration of the mobile terminal 2 selected by the guest.

When the host places the host's mobile terminal 2 over the central apparatus 4 only once and the contactless communication is established only once, the central apparatus 4 permanently registers the mobile terminal 2. Specifically, a condition for the central apparatus 4 to permanently registers the guest's mobile terminal 2 placed over the peripheral apparatus 5 is that the guest's mobile terminal 2 is placed over the peripheral apparatus 5 twice successively. A condition for the central apparatus 4 to permanently registers the host's mobile terminal 2 placed over the central apparatus 4 is that the host's mobile terminal 2 is placed over the central apparatus 4 only once. The central apparatus 4 determines whether the mobile terminal 2 is placed over the central apparatus 4 or the peripheral apparatus 5 and thereby determines whether to register the mobile terminal 2 temporarily or permanently after the contactless communication is established once. The above-mentioned description presupposes that the guest places the guest's mobile terminal 2 over the peripheral apparatus 5. However, the guest's mobile terminal 2 may be permanently registered when the guest places the guest's mobile terminal 2 over the central apparatus 4 on condition that the mobile terminal 2 is placed over the central apparatus 4 only once.

Figure 11A:
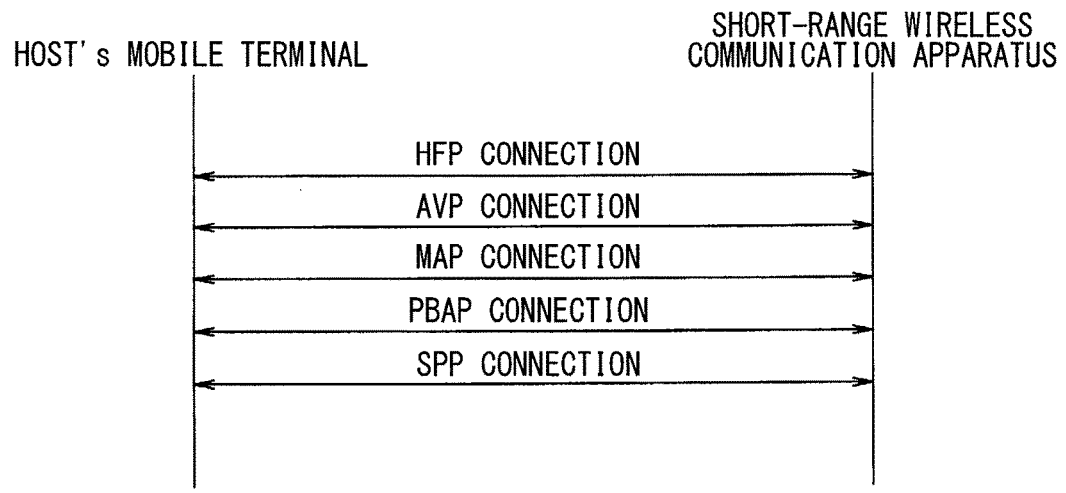
FIG. 11A is a diagram illustrating an example of profile connection.
Figure 11B:
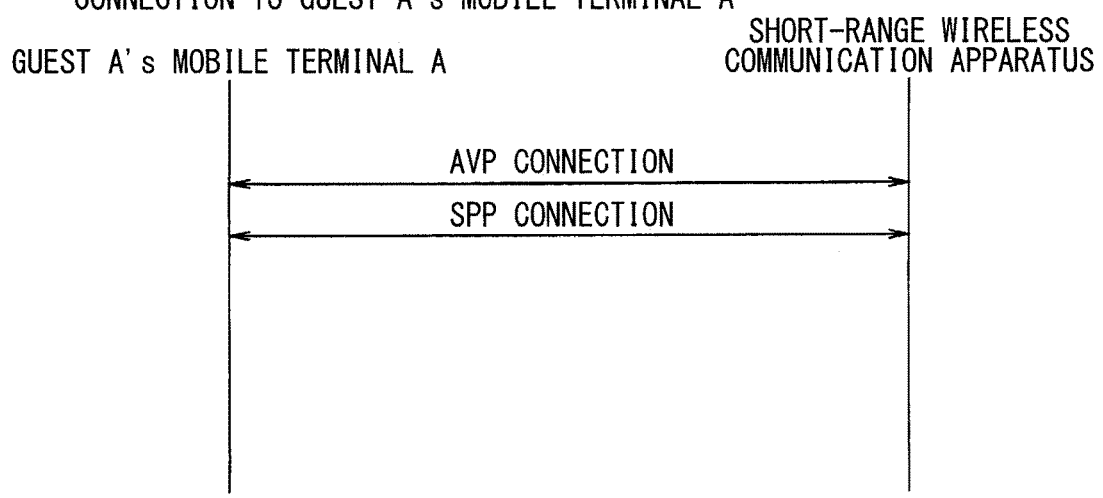
FIG. 11B is a diagram illustrating another example of profile connection.

According to the above-mentioned description, the controller 4a permits the BT communication connection with the mobile terminal 2 and establishes the BT line between the short-range wireless communicator 4b and the short-range wireless communicator 2b to connect with AVP on the BT line. Alternatively, a profile to be connected may differ depending on the host's mobile terminal 2 and guest A's mobile terminal 2 (depending on the classification of the registered mobile terminal 2, data given a permission to receive from the mobile terminal 2 may be selected). For example, connection candidates may include HFP (Hands Free Profile), MAP (Message Access Profile), PBAP (Phone Book Access Profile), and SPP (Serial Port Profile) in addition to AVP. In this case, as illustrated in FIG. 11A, the controller 4a may connect all the profiles when connecting the BT line with the host's mobile terminal 2. As illustrated in FIG. 11B, the controller 4a may connect only the profiles AVP and SPP except HFP, MAP, and PBAP when connecting the BT line with guest A's mobile terminal 2. This is because HFP, MAP, or PBAP treats data containing personal information, but AVP or SPP does not. The controller 4a permits reception of all data from the host's mobile terminal 2. The controller 4a inhibits reception of data containing personal information and permits reception of only data not containing personal information from guest A's mobile terminal 2.

Figure 12:
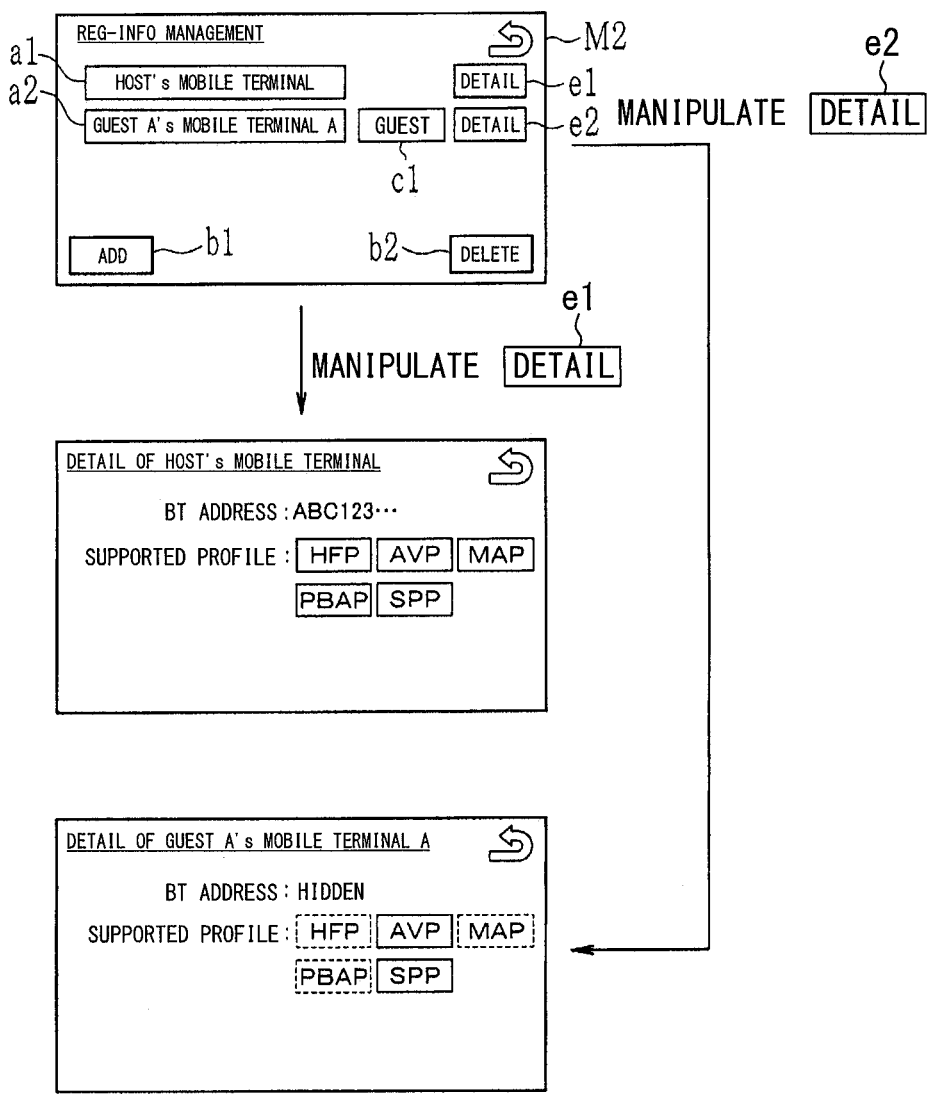
FIG. 12 illustrates another example of transition of screens to manage registration information.

As illustrated in FIG. 12, the controller 4a displays detail buttons e1 and e2 on screen M2 indicating that the host's mobile terminal 2 and guest A's mobile terminal 2 are registered. When the user presses detail button e1, the controller 4a displays a list of profiles available (supported) on the host's mobile terminal 2. The controller 4a notifies that the available profiles are HFP, AVP, MAP, PBAP, and SPP when the host's mobile terminal 2 is a connection destination. When the user presses detail button e2, the controller 4a displays a list of profiles available on guest A's mobile terminal 2. The controller 4a notifies that the available profiles are only AVP and SPP when guest A's mobile terminal 2 is a connection destination. Any mode may be used to notify whether the profile is available. As illustrated in FIG. 12, available profile names and unavailable profile names may be displayed in different colors or gradations. FIG. 12 uses a thick line and a broken line to represent different colors or gradations. Only available profile names may be displayed. The controller 4a may notify the BT address when the host's mobile terminal 2 is a connection destination. The controller 4a may not notify (or may hide) the BT address when guest A's mobile terminal 2 is a connection destination.

According to the first embodiment as above, when the power-on state changes to the power-off state and then the power-off state changes to the power-on state, the central apparatus 4 searches for the registered mobile terminal 2. When the search fails, the central apparatus 4 unregisters the mobile terminal 2 for which search failed. This can prevent an increase in the number of mobile terminals 2 registered. The display of the list of the registered mobile terminals 2 can avoid containing the mobile terminal 2 of the guest not currently using the central apparatus 4. As a result, the guest currently intending to use the central apparatus 4 can easily select the guest's mobile terminal 2. Additionally, the host need not take the effort to unregister the guest's mobile terminal 2 not currently using the central apparatus 4. Additionally, when the contactless communication with the mobile terminal 2 is established and the mobile terminal 2 is registered, the permission of the BT communication connection is kept until it is determined that the BT communication becomes unconnectable. Thus, there is no need to establish the contactless communication each time the mobile terminal 2 permitted to connect the BT communication is changed over. The guest or the host can avoid inconvenient manipulation and easily share music data stored in the mobile terminal 2. This can improve convenience.

When the search for the registered mobile terminal 2 is successful, the central apparatus 4 keeps the successfully searched mobile terminal 2 registered without unregistering that mobile terminal 2. Thus, when the same passenger repeatedly gets into the vehicle, for example, the passenger carrying the passenger's mobile terminal 2 need not place the passenger's mobile terminal 2 over the peripheral apparatus 5 each time he or she gets into the vehicle. This can further improve convenience.

When the permanent registration condition is satisfied, the central apparatus 4 permanently registers the mobile terminal 2 that satisfies the permanent registration condition. The BT communication is permitted until a permanent registration release condition is satisfied. The central apparatus 4 permanently registers the mobile terminal 2 of the passenger who frequently uses the central apparatus 4. Also in this case, the passenger need not place the passenger's mobile terminal 2 over the peripheral apparatus 5 each time the passenger gets into the vehicle with the passenger's mobile terminal 2. This can further improve convenience.

When the guest places the guest's mobile terminal 2 over the peripheral apparatus 5 only once and the contactless communication is established only once, the central apparatus 4 registers the guest's mobile terminal 2. When the guest places the guest's mobile terminal 2 over the peripheral apparatus 5 twice successively and the contactless communication is established twice successively, the central apparatus 4 permanently registers the guest's mobile terminal 2. Thus, the guest can easily select the temporary registration or the permanent registration by selecting the number of times to place the guest's mobile terminal 2 over the peripheral apparatus 5. This can further improve convenience.

When the guest selects the mobile terminal 2 and presses addition button b1, the central apparatus 4 permanently registers the mobile terminal 2 selected by the guest. When the guest selects the mobile terminal 2 and press deletion button b2, the central apparatus 4 releases the permanent registration of the mobile terminal 2 selected by the guest. Thus, the guest can easily select the temporary registration or the permanent registration using simple manipulation of just pressing addition button b1 or deletion button b2. This can further improve convenience.

The short-range wireless communication apparatus 3 is divided into the central apparatus 4 and the peripheral apparatus 5. The peripheral apparatus 5 includes the contactless communicator 5b. Thus, the passenger can register the passenger's mobile terminal 2 to the central apparatus 4 by placing the passenger's mobile terminal 2 over the peripheral apparatus 5, not the central apparatus 4. This can further improve convenience.

Second Embodiment

Figure 13:
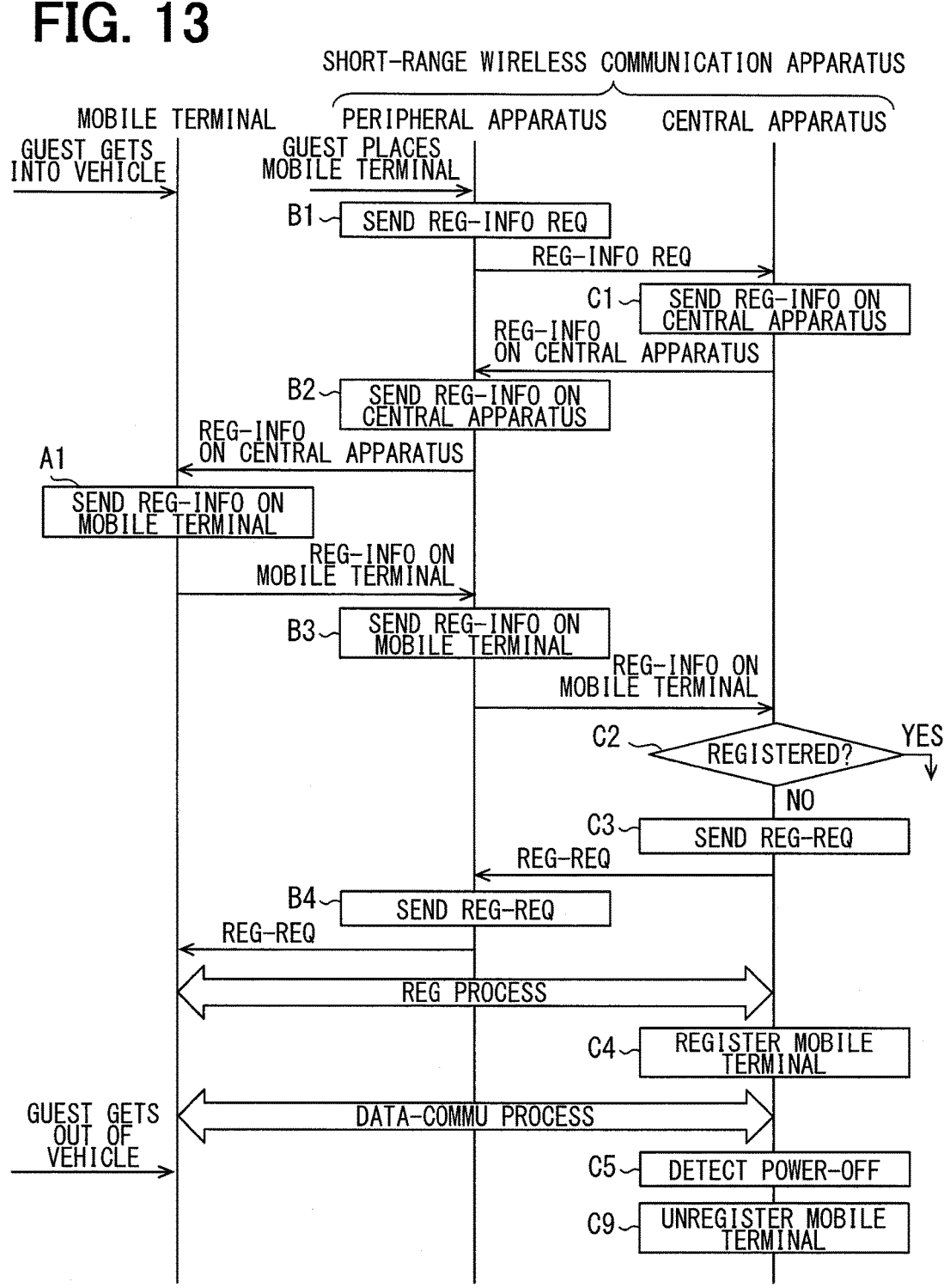
FIG. 13 is a sequence diagram illustrating a second embodiment.

The second embodiment will be described with reference to FIG. 13. The description below omits the same parts as the first embodiment and explains differences between both embodiments. The second embodiment immediately unregisters the most recent guest's mobile terminal 2 when the host changes the ACC switch from the on-state to the off-state to get out of the vehicle.

When the host changes the ACC switch from the on-state to the off-state to get out of the vehicle and the power detector 4g detects a change from the power-on state to the power-off state (the BT communication becomes unconnectable) (C5), the controller 4a disconnects the BT line established between the short-range wireless communicator 4b and the short-range wireless communicator 2b. In this case, the controller 4a does not search for the mobile terminal 2 upon detection of a change from the power-off state to the power-on state as described in the first embodiment. The controller 4a deletes (or erases) the registration information about the most recent guest's mobile terminal 2 stored in the storage 4f at the time and unregisters the most recent guest's mobile terminal 2 (C9, fifth or third procedure).

According to the second embodiment, the central apparatus 4 unregisters the registered mobile terminal 2 when the power-on state changes to the power-off state. Similarly to the first embodiment, the second embodiment can prevent an increase in the number of mobile terminals 2 registered. Inefficient display of the mobile terminal 2 of the guest not currently using the central apparatus 4 is avoided in the list of the registered mobile terminals 2. As a result, the guest currently intending to use the central apparatus 4 can easily select the guests mobile terminal 2. The host need not take the effort to unregister the mobile terminal 2 of the guest not currently using the central apparatus 4.

Other Embodiments

The present disclosure is not limited to the above-mentioned embodiments but also include modified or enhanced working examples as follows.

Although the BT communication is illustrated, the short-range wireless communication is also applicable to the WiFi (registered trademark) communication.

The present disclosure is also applicable when two or more passengers or guests get into the vehicle and individually place the mobile terminals 2 over the peripheral apparatus 5. There may be a case where guests A and B get into the vehicle at the same time and individually place their mobile terminals 2 over the peripheral apparatus 5 to establish the contactless communication. In this case, guest A's mobile terminal 2 and guest B's mobile terminal 2 are registered individually. Thereafter, the power-on state may change to the power-off state and then the power-off state may change to the power-on state. The central apparatus 4 then searches for guest A's mobile terminal 2 and guest B's mobile terminal 2 individually.

According to the illustrated configuration, the central apparatus 4 includes the contactless communicator. However, the central apparatus 4 may not include the contactless communicator. Also in this case, the driver, like the passenger, places the driver's mobile terminal 2 over the peripheral apparatus 5. According to the illustrated configuration, the central apparatus 4 and the peripheral apparatus 5 are provided. However, only the central apparatus 4 may be provided. In this case, the passenger, like the driver, places the passenger's mobile terminal 2 over the central apparatus 4.

There has been illustrated the configuration that searches for the registered mobile terminal 2 at the time when the power-off state changes to the power-on state after the power-on state changes to the power-off state. Alternatively, the registered mobile terminal 2 may be searched for after a lapse of specified time (e.g., 24 hours) from the last BT communication connection. This configuration can prevent an increase in the number of registered mobile terminals 2 even when a passenger changes to (replaces) another while the power remains turned on.

A profile other than AVP, HFP, MAP, PBAP, and SPP may be connected between the mobile terminal 2 and the central apparatus 4. Several profiles may be connected in any order.

The invention claimed is:

1. A short-range wireless communication apparatus comprising:
 a contactless communicator for performing contactless communication with a mobile terminal;
 a short-range wireless communicator for performing short-range wireless communication with the mobile terminal;
 a power detector for detecting an on state and an off state of an accessory switch of a vehicle; and
 a controller
  for registering the mobile terminal establishing the contactless communication upon determining that the contactless communication is established between the mobile terminal and the contactless communicator, and
  for permitting connection of the short-range wireless communication between the short-range wireless communicator and the mobile terminal until determining that the short-range wireless communication becomes unconnectable,
 wherein:
 when the power detector detects that the accessory switch changes from the on state to the off state and then to the on state, the controller causes the short-range wireless communicator to search for the registered mobile terminal; and
 when the short-range wireless communicator does not find the registered mobile terminal during the search, the controller unregisters the mobile terminal that was not found during the search.

2. The short-range wireless communication apparatus according to claim 1, wherein:
 after a lapse of specified time from the last connection of the short-range wireless communication between the short-range wireless communicator and the mobile terminal, the controller causes the short-range wireless communicator to search for the registered mobile terminal; and when the short-range wireless communicator does not find the registered mobile terminal during the search, the controller unregisters the mobile terminal that was not found during the search.

3. The short-range wireless communication apparatus according to claim 1, wherein when the search for the registered mobile terminal is successful, the controller continues registration of the mobile terminal.

4. The short-range wireless communication apparatus according to claim 1, wherein:

when the controller determines that a permanent registration condition is satisfied after the mobile terminal establishing the contactless communication is registered, the controller permanently registers the mobile terminal satisfying the permanent registration condition; and the controller permits the connection of the short-range wireless communication between the short-range wireless communicator and the mobile terminal until a permanent registration release condition is satisfied.

5. The short-range wireless communication apparatus according to claim 4, wherein when the controller determines that the contactless communication is successively established a plurality of times between the mobile terminal and the contactless communicator, the controller determines that the permanent registration condition is satisfied.

6. The short-range wireless communication apparatus according to claim 5, further comprising:

a second input device for accepting user's second manipulation, wherein when the controller determines that the second input device accepts the user's second manipulation, the controller determines the permanent registration release condition is satisfied.

7. The short-range wireless communication apparatus according to claim 4, further comprising:

a first input device for accepting user's first manipulation, wherein:

when the controller determines that the first input device accepts the user's first manipulation, the controller determines the permanent registration condition is satisfied.

8. The short-range wireless communication apparatus according to claim 1, wherein depending on classification of the mobile terminal, the controller selects data that the short-range wireless communication apparatus is permitted to receive from the registered mobile terminal.

9. The short-range wireless communication apparatus according to claim 1, wherein the short-range wireless communicator is provided for a first apparatus and the contactless communicator is provided for a second apparatus different from the first apparatus.

10. The short-range wireless communication apparatus according to claim 1, wherein the short-range wireless communication apparatus is a vehicular short-range wireless communication apparatus and is mounted on the vehicle.

11. The short-range wireless communication apparatus according to claim 10, wherein the short-range wireless communication apparatus has a central apparatus and a peripheral apparatus, the central apparatus is provided near a driver seat, and the peripheral apparatus is provided near a passenger seat or a rear seat.

12. The short-range wireless communication apparatus according to claim 10, wherein a list of the registered mobile terminals is displayed on a display of the central apparatus.

13. The short-range wireless communication apparatus according to claim 1, wherein the controller registers the mobile terminal by storing an address and security information associated with the mobile terminal in a storage and wherein the controller unregisters the mobile terminal by deleting the address and the security information associated with the mobile terminal from the storage.

14. A non-transitory storage medium storing a registration management program for a controller of a short-range wireless communication apparatus, the short-range wireless communication apparatus including a contactless communicator for performing contactless communication with a mobile terminal, a short-range wireless communicator for performing short-range wireless communication with the mobile terminal, and a power detector for detect an on state and an off state of an accessory switch of a vehicle, the registration management program causing a microcomputer of the controller to perform:

a first procedure that registers the mobile terminal establishing the contactless communication with the contactless communicator when it is determined that the contactless communication is established between the mobile terminal and the contactless communicator;

a second procedure that permits connection of the short-range wireless communication between the short-range wireless communicator and the mobile terminal until it is determined that the short-range wireless communication becomes unconnectable;

a third procedure that causes the short-range wireless communicator to search for the registered mobile terminal when the power detector detects that the accessory switch changes from the on state to the off state and then to the on state; and a fourth procedure that unregisters the mobile terminal when the short-range wireless communicator does not find the registered mobile terminal during the search in the third procedure.

* * * * *